United States Patent [19]
Suzuki et al.

[11] 3,904,687
[45] Sept. 9, 1975

[54] METHOD FOR PRODUCTION OF CATIONIC SURFACTANT

[75] Inventors: Shigeyuki Suzuki, Machida; Isamu Kaneda; Hiroshi Endo, both of Tokyo; Kazuo Miyata, Yamato; Tadao Horiguchi; Kazumasa Yamamoto, both of Yokohama, all of Japan

[73] Assignees: Kureha Kagaku Kogyo K.K., Tokyo; Kurita Water Industries Ltd., Osaka, both of Japan

[22] Filed: Oct. 18, 1971

[21] Appl. No.: 190,356

[30] Foreign Application Priority Data
Oct. 17, 1970 Japan................................. 45-90961

[52] U.S. Cl. .......... 260/564 E; 204/163 R; 252/545; 260/288 R; 260/296 R; 260/566 F; 260/567.6 M; 260/583 R; 260/584 R
[51] Int. Cl.$^2$ ...................................... C07C 119/00
[58] Field of Search ..........:.......... 260/564 E; 204/163 R

[56] References Cited
OTHER PUBLICATIONS

Walker, "Formaldehyde," 2nd Ed., (1953), pp. 336–345.
Noller, "Chemistry of Organic Compounds," 3rd Ed., pp. 115–116, 259 and 497–498.
Smith, "Open Chain Nitrogen Compounds," Vol. 1, pg. 271, (1965).

Primary Examiner—Leon Zitver
Assistant Examiner—Gerald A. Schwartz
Attorney, Agent, or Firm—Wenderoth, Lind & Ponack

[57] ABSTRACT

New type of water-soluble, cationic surfactant having an excellent flocculating effect is obtained by subjecting a raw material aromatic hydrocarbon compound to polycondensation, chlorination, and amination reactions.

2 Claims, No Drawings

METHOD FOR PRODUCTION OF CATIONIC SURFACTANT

This invention relates to a method for producing a water-soluble substance having a cationic type interfacial activity. More particularly, it is concerned with a method for producing a new cationic surfactant, wherein aromatic hydrocarbon compound having side chains which contain therein active hydrogen capable of substitution by chlorine (hereinafter simply referred to as "active hydrogen," is subjected to polycondensation reaction by using formaldehyde, then the resultant polycondensate is chlorinated under irradiation with, and is further reacted with ultraviolet light various amines to connect the same to a water-soluble cationic substance.

So far, it has been known to produce cationic surfactants by introducing the chloromethyl radical into aromatic compounds such as dodecylbenzene, octylbenzene, etc.; thereafter the compound is reacted with pyridine, trialkylamine, etc., to convert it to a pyridinum salt, quarternary ammonium salt, etc. These compounds, however, have weak ability to flocculate solid particles suspended in water; hence they cannot serve a practical use.

It is therefore an object of the present invention to provide a new type of cationic surface activating substance capable of exhibiting sufficient flocculating effect in practical use.

It is another object of the present invention to provide a method for producing such cationic surfactant, wherein an aromatic compound having side chains which contain therein active hydrogen is polycondensed under particular reaction conditions to obtain a polycondensate of the aromatic compound, having a large molecular weight, then the polycondensate is chlorinated under irradiation with ultraviolet ray to substitute the active hydrogen in the side chains with chlorine, which is highly reactive, and finally this chlorinated substance is reacted with amine derivatives such as thioureas, alkylamines, pyridines, etc., to connect the same to a cationic surface activating substance having an excellent flocculating effect.

The foregoing objects and details of the present invention will become more apparent from the following description thereof when read in conjunction with preferred examples.

First of all, the aromatic hydrocarbon compounds used herein and having side chains which contain therein active hydrogen capable of being substituted by chlorine are designated as follows.

a. benzene derivatives having the methyl group such as toluene, xylene, mesitylene, etc.;

b. alkylbenzene containing more than one alkyl group such as ethylbenzene, dibutylbenzene, etc.;

c. alkylnaphthalene containing more than one alkyl group, represented by the methyl group, as above;

d. alkylated polycyclic aromatic hydrocarbons containing more than one alkyl group; and e. aromatic hydrocarbons containing therein an alicyclic structure, such as tetralin. For the aromatic hydrocarbon of this type, substances obtained by partial hydrogenation of condensed polycyclic aromatic compounds resulting from pyrolysis of distilled fractions of petroleum such as naphtha, kerosene, light oils, heavy oils, asphalt, etc., at a very high temperature are considered to be useful materials.

Important in the present invention is that the above-mentioned aromatic compound as the starting material should be subjected to polycondensation in the first step so as to connect it to an aromatic compound having large molecular weight which is then further subjected to chlorination and subsequent amine treatment to connect the same to a high molecular, water-soluble, cationic substance. Mere chlorination and amine treatment of the aromatic compound does not result in the cationic substance having required flocculating effect.

In this first step of polycondensation, any of the raw material compounds as classified hereinabove is caused to react with an aqueous solution of formalin, para-formaldehyde, or trioxane in the presence of a catalyst such as mineral acids (e.g., sulfuric acid, perchloric acid), organic sulfonic acid (e.g., benzene sulfonic acid, paratoluene sulfonic acid, etc.), or Lewis acids (e.g., zinc chloride, aluminum chloride, etc.)

Solvents such as organic acids (e.g., acetic acid, propionic acid, etc.), organic chlorides (e.g., chloroform, carbon tetrachloride, 1,2-dichloroethane, perchloroethylene, etc.), or others may be used to enable the reaction to proceed smoothly. Nitrobenzene, benzonitrile, etc., may also be used as the solvent. These solvents are properly selected in an attempt to facilitate the polycondensation reaction and to conduct the manufacturing process in a most advantageous manner. For example, when the polycondensation is to be conducted between meta-xylene as the raw material and p-formaldehyde in the presence of sulfuric acid as the catalyst, if acetic acid is used as the solvent, a high molecular polycondensate can be obtained at a higher rate of yield than in the case of using no acetic acid. Also, if the reaction is conducted by using a solvent such as 1,2-dichloroethane at the boiling point thereof, it is possible to remove water produced by the polycondensation reaction as the azeotropic substance, hence the reaction proceeds quickly. A solvent such as 1,2-dichloroethane is also suited as the solvent for chlorination in the subsequent step.

The polycondensate thus obtained should have a mean molecular weight of 200 and above to give the end product a desired capability of flocculation. The upper limit of the mean molecular weight is difficult to determine. Any value which is capable of yielding a water-soluble cationic surfactant as the end product will meet the present purpose. In general, the polycondensate should have a mean molecular weight range of from 200 to 3,000.

In the second step of chlorination reaction, the polycondensate is dissolved in a solvent and the reaction is conducted under such conditions that chlorine may be selectively substituted for the active hydrogen present in the side chains of the aromatic compound without causing substitution for hydrogen in the aromatic nucleus (aromatic substitution). This reaction is conducted, for example, by blowing chlorine gas into the reaction vessel from the bottom part thereof under ultraviolet ray irradiation, while refluxing the solvent. The solvent for this purpose is: dichloromethane, chloroform, carbon tetrachloride, 1,2-dichloroethane, perchloroethylene, chlorobenzene, benzene, nitrobenzene, benzonitrile, etc. The chlorination should preferably be conducted to the extent that one chlorine atom is introduced into most of the side chains.

The polycondensate material thus chlorinated is then brought to the third step reaction, where it is reacted with amines such as thioureas, etc. For this reaction, the following method is adopted, for example: (1) one or more kinds of bases, particularly amine derivatives are directly added to the chlorination reaction mixture and are reacted with each other; or (2) the polycondensed material is dissolved in a solvent such as, for instance, tetrahydrofuran, 1,2-dichloroethane, perchloroethylene, acetone, methanol, or water in an amount of 1 to 20 percent with respect to the total solvent, and is then reacted with the amines.

The useful amine derivatives in this treatment are: thioureas such as thiourea, alkyl thiourea, phenyl thiourea, etc.; pyridines such as pyridine, picoline, quinoline, etc.; trialkyl amines such as dimethyl benzylamine, dimethyl laurylamine, etc.; dialkyl amines such as diethyl amine, diethanol amine, etc.; monoalkyl amines such as ethyl amine, ethanol amine, etc.; and Schiff bases such as benzylidene aniline.

The extent of amination of the chlorinated polycondensate is preferably such that the chlorine which was introduced into the material at the preceding step is totally reacted with the amines. In practice, however, if the degree of reaction is raised to such an extent that the material is rendered water-soluble, sufficient flocculating effect can be imparted to the end product.

The thus produced water-soluble cationic salts of isothiuronium type, pyridinum type, and quarternary ammonium type, etc., are quite novel substances which cannot be found in any technical literatures so far published.

The water-soluble cationic surfactant according to the present invention is in general a solid substance of light yellow or light brown, color is soluble in water and methanol, an is very useful for a variety of purposes such as flocculation of organic and inorganic particles suspended in water, flocculation of anionic organic substance dissolved in water, and other uses.

In order to enable skilled persons in the art to reduce the invention to practice, the following preferred examples are presented. It should, however, be noted that the invention is not limited to these examples alone, but any changes and modifications may be made within the purview of the invention as afforded by the appended claims.

EXAMPLE 1

Into a three-necked flask of a 30-liter capacity, there were charged 3.0 kg. of meta-xylene, 1.27 kg. of paraformaldehyde, 0.3 kg. of 98 percent conc. sulfuric acid, and 9.0 kg. of acetic acid. The batch was subjected to reaction for 5 hours at a temperature of from 110° to 115°C, while agitating, after which it was distilled for 1 hour at this temperature level to extract 7.6 kg. of acetic acid from the reaction system.

Subsequently, 20 kg. of 1,2-dichloroethane was added to 5.97 kg. of distilled residue and sufficiently agitated, and then 0.35 kg. of calcium oxide was added to the distilled residue to neutralize the same, thereafter the precipitated substance was removed by filtration under pressure. As the result, 25.37 kg. of 1,2-dichloroethane solution containing therein 3.76 kg. of meta-xylene condensate was obtained. The melting point of the m-xylene condensate dissolved in this solution was approximately 290°C and its mean molecular weight was 1,630.

Into this 1,2-dichloroethane solution of the above-mentioned m-xylene condensate, chlorine gas was blown at a rate of 10 l/min by reflux under irradiation of high voltage mercury lamp so as to chlorinate the solution and to extract 1,2-dichloroethane therefrom. 5.78 kg. of chlorinated substance of light brown color was obtained, the chlorine content of which was found to be 34.8 percent.

100 g. of this chlorinated substance was dissolved in 500 g. of acetone, to which 73 g. of thiourea was added, and the batch was agitated for 2 hours under reflux. Upon filtration and drying of the reacted substance, 173 g. of a solid substance of light yellow color was obtained. As the results of measurement by infrared ray spectrum analysis, elementary analysis, etc., this solid substance was recognized to be the intended isothiuronium salt. (This substance will hereinafter be referred to as "A".)

179 g. of pyridinium salt was obtained by the same process as described in the foregoing except that 100 g. of pyridine was used in place of 100 g. of thiourea. (This substance will hereinafter be referred to as "B.")

By using these two substances A and B, tests for their flocculating effect was conducted with respect to kaolin suspension and an aqueous solution of an acidic dye (Amaranth red), the results of which are as follows.

a. Test in kaolin suspension:

Suspension liquid prepared by dispersing 5g of kaolin in 100 cc of water was poured in glass cylinders of 30 cm in depth. To this kaolin suspension in each cylinder, the above-mentioned substances A and B were added respectively so that the content of each of these substances may be 0.01 percent with respect to the total quantity of water. Besides tthis, two other substances for comparison purposes were added to the same quantity of the suspension liquid at the same content as in the substances A and B. The states of flocculation and precipitation were compared among these samples. The following Table 1 shows the results of the comparison, from which it is recognized that the cationic surfactant obtained by the present invention has higher speed of precipitation at the interface of the supernant liquid and the kaolin suspension layer than that of the comparative substance.

Table 1

| Sample Surfactant | Blank | Invention | | Comparison | |
|---|---|---|---|---|---|
| | nil | A | B | Dodecylbenzyl isothiuronium chloride | Dodecylbenzyl pyridinum chloride |
| Precipitation Speed (cm/min.) | 1.24 | 4.19 | 4.53 | 1.17 | 1.72 | b. Test in aqueous solution of Amaranth red :

100 cc of 0.01 percent solution of Amaranth red was poured in each of five beakers of 200 cc capacity, into which each of the cationic surfactants A and B according to the present invention and the comparative substances shown in Table 1 above was added in an amount of 0.01 percent with respect to the total quantity of water. The flocculating state was observed among these samples along with a blank solution containing no such surfactant. The results are shown in the following Table 2 in terms of residual chromaticity in the supernatant liquid, from which it will be recognized that the cationic surfactant according to the present invention possesses a remarkable effect.

the present invention exhibit excellent flocculating effect in comparison with the comparative substance.

Table 3

| RAW MATERIAL | FORMALDEHYDE | CATALYST | SOLVENT | REACTION TEMP. (°C) | REACTION TIME (hrs) | MOLECULAR WEIGHT OF POLY-CONDENSATE | FLOCCULATING EFFECT OF ISOTHIURONIUM SALT WITH RESPECT TO caolin SUSPENSION (cm/min) |
|---|---|---|---|---|---|---|---|
| meta-xylene | p-formaldehyde | sulfuric acid | 1,2-dichloroethane | 80 | 5 | 1140 | 4.28 |
| 2-methyl naphthalene | p-formaldehyde | aluminum chloride | acetic acid | 115 | 6 | 1740 | 4.51 |
| 2,6-dimethyl naphthalene | p-formaldehyde | sulfuric acid | acetic acid | 115 | 5 | 1480 | 4.36 |
| 2-butyl napthalene | p-formaldehyde | sulfuric acid | acetic acid | 115 | 6 | 1030 | 4.09 |
| tetralin | p-formaldehyde | sulfuric acid | acetic acid | 115 | 4 | 980 | 4.21 |
| meta-xylene | formalin | sulfuric acid | — | 100 | 7 | 318 | 3.51 |
| meta-xylene | p-formaldehyde | p-toluene sulfonate | 1,2-dichloroethane | 80 | 6 | 940 | 4.32 |
| meta-xylene | p-formaldehyde | sulfuric acid | acetic acid | 115 | 10 | 2730 | 4.86 |
| 2,6-dimethyl naphthalene (for comparison) | No polycondensation conducted | | | | | | 1.31 |

NOTE:
The tests for the flocculating effect were conducted in the same manner as in Example 1 above, in which the polycondensate was chlorinated in the same manner as in Example 1, and then connected into the isothiuronium salt. The quantitative relationship among raw material formaldehyde, catalyst, and solvent is substantially the same as in Example 1.

Table 2

| | Blank | Invention | | Comparison | |
|---|---|---|---|---|---|
| Sample Surfactant | Nil | A | B | Dodecylbenzyl isothiuronium chloride | Dodecylbenzyl pyridinum chloride |
| Residual Chromaticity (ppm) | 100 | 0.9 | 0.6 | 98 | 99 |

EXAMPLE 2

Various kinds of aromatic hydrocarbon compounds containing therein side chains having active hydrogen at its α-position and those compounds containing therein alicyclic structure were subjected to polycondensation under the reaction conditions as shown in Table 3 below.

The polycondensates thus produced were further subjected to reactions for chlorination and subsequent isothiuronium salt production to finally obtain the intended cationic substance.

The relationship between the molecular weight of the polycondensates and the flocculating effect of the cationic substances obtained from these polycondensates (in terms of the precipitation speed of the kaolin suspension) are as shown in Table 3 below, from which it is recognized that the cationic surfactants according to

What we claim is:

1. A water-soluble cationic surfactant produced by a method which comprises the steps of:

a. subjecting xylene to polycondensation by reacting the xylene with paraformaldehyde in the presence of a catalyst selected from the group consisting of sulfuric acid, aluminum chloride, para-toluene sulfonic acid, benzene sulfonic acid, zinc chloride and perchloric acid to produce a polycondensate of the xylene having a mean molecular weight of from 200 to 3,000.

b. introducing chlorine gas into said polycondensate under irradiation of ultraviolet light to substitute chlorine for the active hydrogen of the side chains of the xylene, while refluxing in a solvent selected from the group consisting of dichloromethane, chloroform, carbon tetrachloride, 1,2-dichloroethane, perchloroethylene, chlorobenzene, benzene, nitrobenzene and benzonitrile, and c. subjecting the resultant chlorinated polycondensate to treatment with thiourea to cause the thiourea to react with the chlorine introduced into the polycondensate and thus render the chlorinated polycondensate water-soluble.

2. The water-soluble cationic surfactant according to claim 1, wherein the xylene is metaxylene.

* * * * *